(12) United States Patent
McCracken et al.

(10) Patent No.: US 8,104,391 B2
(45) Date of Patent: Jan. 31, 2012

(54) APPARATUS AND METHOD FOR SLICING FOOD PRODUCTS

(75) Inventors: Anthony A. McCracken, Schererville, IN (US); Michael S. Jacko, Westville, IN (US)

(73) Assignee: Urschel Laboratories, Inc., Valparaiso, IN (US)

( * ) Notice: Subject to any disclaimer, the term of this patent is extended or adjusted under 35 U.S.C. 154(b) by 452 days.

(21) Appl. No.: 12/029,927

(22) Filed: Feb. 12, 2008

(65) Prior Publication Data

US 2008/0190255 A1 Aug. 14, 2008

Related U.S. Application Data

(60) Provisional application No. 60/889,590, filed on Feb. 13, 2007.

(51) Int. Cl.
*B26D 1/29* (2006.01)
(52) U.S. Cl. ............ 83/663; 83/331; 83/391; 83/596; 83/932
(58) Field of Classification Search .......... 83/932, 83/13, 663, 350, 356.3, 676, 677, 591, 592, 83/594–596, 409, 418–421, 391, 392, 394, 83/395, 703, 704, 37, 268, 270, 300, 331, 83/349, 438, 448, 761, 762
See application file for complete search history.

(56) References Cited

U.S. PATENT DOCUMENTS

| 419,364 | A | * | 1/1890 | Schoell ................ 83/356.3 |
|---|---|---|---|---|
| 1,898,160 | A | | 9/1931 | Aeschbach |
| 3,630,248 | A | * | 12/1971 | Hanson ................ 241/278.2 |
| 3,704,736 | A | * | 12/1972 | Pratley ................ 83/397 |
| 5,896,801 | A | | 4/1999 | Jacko |
| 5,992,284 | A | | 11/1999 | Bucks |
| 6,148,702 | A | | 11/2000 | Bucks |
| 6,148,709 | A | | 11/2000 | Bucks |
| 6,460,444 | B2 | | 10/2002 | Jacko |
| 6,920,813 | B2 | | 7/2005 | Bucks |

* cited by examiner

*Primary Examiner* — Phong Nguyen
(74) *Attorney, Agent, or Firm* — Hartman & Hartman, P.C.; Gary M. Hartman; Domenica N.S. Hartman

(57) ABSTRACT

An apparatus and method for slicing food products, and particularly soft, pliable food products susceptible to being deformed to the slicing process. The slicing apparatus includes a slicing wheel assembly and device for stabilizing the food product as it is being fed through the slicing wheel assembly. The slicing wheel assembly includes a hub, a rim circumscribing the hub so as to define an annular space therebetween, and arcuate blades extending between and removably attached to the hub and rim. The hub, rim, and blades lie in a cutting plane of the slicing wheel assembly. Each blade has an arcuate cutting edge on a convex portion thereof, with radially innermost and radially outermost extents of the blade that do not lie on the same radial of the slicing wheel assembly.

20 Claims, 4 Drawing Sheets

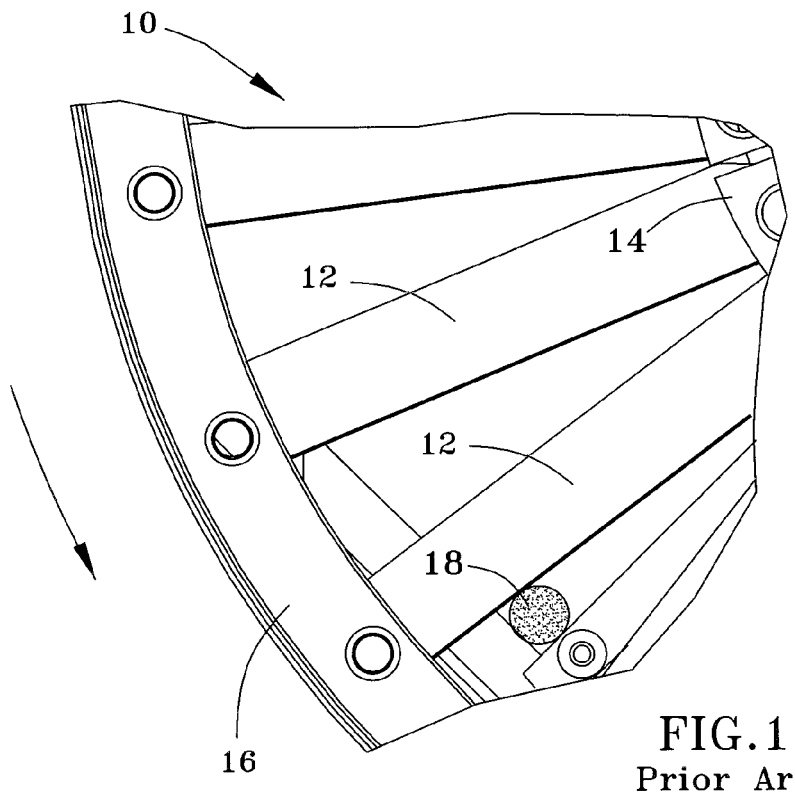
FIG. 1
Prior Art
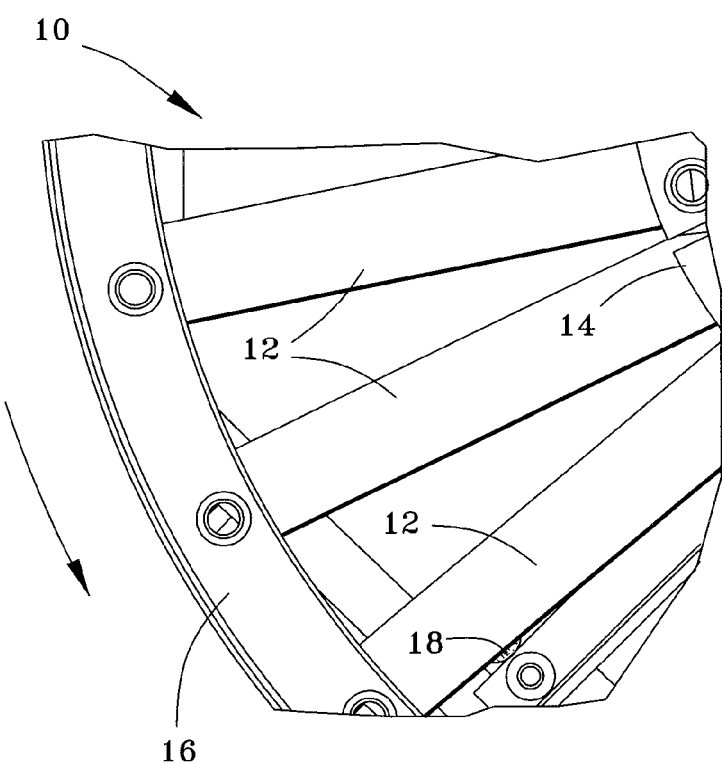
FIG. 2
Prior Art
FIG. 3A
Prior Art
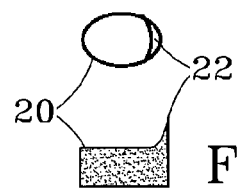
FIG. 3B
Prior Art

APPARATUS AND METHOD FOR SLICING FOOD PRODUCTS

CROSS REFERENCE TO RELATED APPLICATIONS

This application claims the benefit of U.S. Provisional Application No. 60/889,590, filed Feb. 13, 2007, the contents of which are incorporated herein by reference.

BACKGROUND OF THE INVENTION

The present invention generally relates to cutting methods and equipment, and more particularly to an apparatus capable of slicing very soft food products, such as bread dough, fresh meat, etc., to consistently have a desired size and shape.

Various types of machines and equipment are known for use in cutting, slicing, and shredding food products. Notable examples include rotating cutting wheels of the types disclosed in commonly-assigned U.S. Pat. No. 5,896,801 to Jacko, U.S. Pat. No. 5,992,284 to Bucks, U.S. Pat. No. 6,148,702 to Bucks, U.S. Pat. No. 6,148,709 to Bucks, U.S. Pat. No. 6,460,444 to Jacko, U.S. Pat. No. 6,792,841 to Bucks, and U.S. Pat. No. 6,920,813 to Bucks. Notable commercial embodiments of rotating cutting equipment include the TranSlicer 2000® and the MicroSlice® wheel, both of which are manufactured by Urschel Laboratories, Inc.

FIGS. 1 and 2 represent fragmentary plan views of a cutting wheel 10 configured generally in accordance with the above examples, and depict the initiation (FIG. 1) and near completion (FIG. 2) of a cutting operation performed on a food product 18. The cutting wheel 10 is made up of knives 12 extending as radials from a hub 14 to a rim 16, which together define a cutting plane through which the food product 18 is conveyed. Cutting wheels of the type shown in FIGS. 1 and 2 have been successfully used to cut and slice a wide variety of food products, including vegetables and dairy products, to yield consumer-ready food products having consistently desirable sizes and shapes. However, difficulties can be encountered when using cutting wheels on very soft, pliable food products, such as bread dough, fresh meat, etc. In particular, it has been observed that a protrusion or "tail" may be formed on such products at the very end of the cutting action. As an example, if the food product 18 represented in FIGS. 1 and 2 is cylindrical or rod-shaped bread dough, the resulting cut product typically has an appearance similar to that represented in FIGS. 3A and 3B, which are top and side views, respectively, of a cut product 20. As evident from FIG. 3A, the product 20 has acquired an oval or elliptical shape from being deformed during the cutting operation, and FIGS. 3A and 3B show the product 20 as having a tail 22 formed during the final cutting sequence (FIG. 2) as a result of the product 18 yielding and tearing instead of being cleanly cut. While this shape may be acceptable for some products, in other cases the desire is for the product 20 to have a uniform disk shape.

BRIEF SUMMARY OF THE INVENTION

The present invention provides an apparatus for slicing food products, and particularly soft, pliable food products susceptible to being deformed when being cut. The slicing apparatus generally includes a slicing wheel assembly and means for stabilizing the food product as it is being fed through the slicing wheel assembly. The slicing wheel assembly includes a hub, a rim circumscribing the hub so as to define an annular space therebetween, and arcuate blades extending between and removably attached to the hub and rim. The hub, rim, and blades lie in a cutting plane of the slicing wheel assembly. Each blade has an arcuate cutting edge on a convex portion thereof, and radially innermost and radially outermost extents of the blade do not lie on the same radial of the slicing wheel assembly.

According to a preferred aspect of the invention, the slicing wheel assembly provides a slicing action that is different from the cutting or chopping action performed with cutting wheels of the prior art, such as the wheel 10 of FIGS. 1 and 2. The slicing action achieved with the wheel assembly of this invention has been shown to be capable of more consistently and uniformly forming a final food product without undesirable deformities, such as the tail 22 shown on the soft, pliable food product 20 of FIGS. 3A and 3B.

Other objects and advantages of this invention will be better appreciated from the following detailed description.

BRIEF DESCRIPTION OF THE DRAWINGS

FIGS. 1 and 2 are fragmentary views of a cutting wheel performing a cutting sequence through a food product in accordance with the prior art.

FIGS. 3A and 3B are top and side views, respectively, that represent the appearance of a soft pliable food product produced by the cutting sequence of FIGS. 1 and 2.

DETAILED DESCRIPTION OF THE INVENTION

Figure 4:
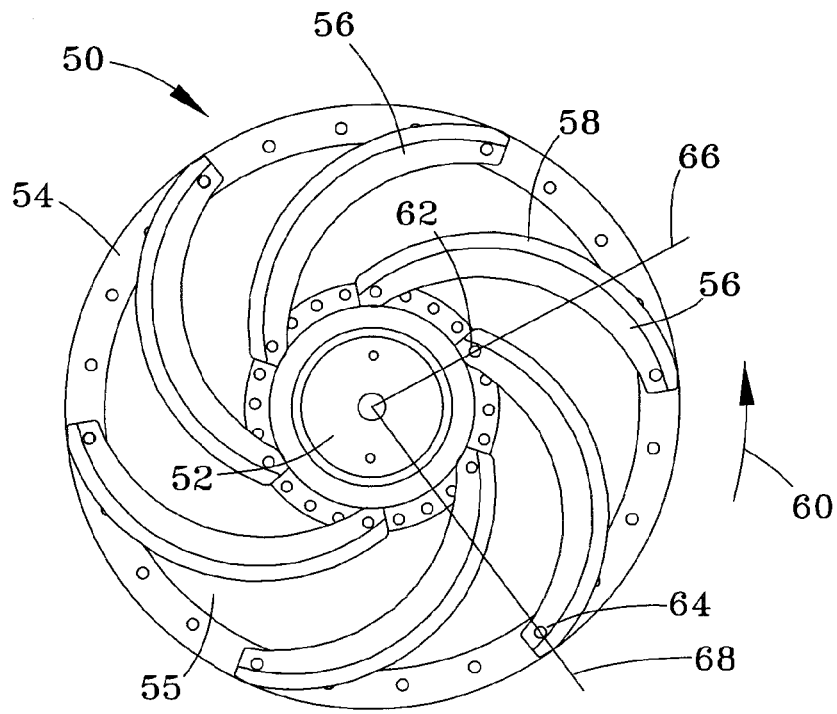
FIG. 4 represents a plan view of a slicing wheel assembly in accordance with the present invention.
Figure 5:
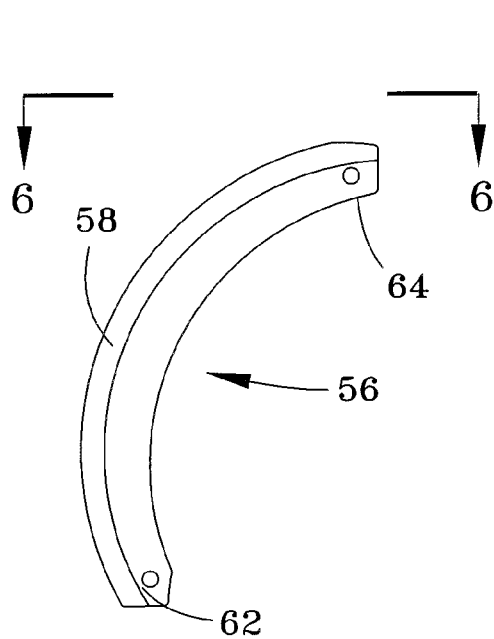
FIGS. 5 and 6 represent, respectively, plan and side views of a blade used in the slicing wheel assembly of FIG. 4.
Figure 6:
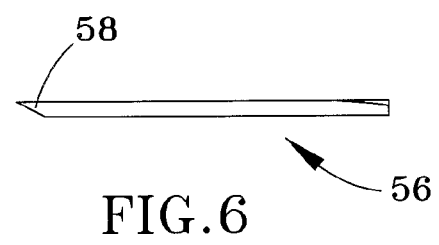

As depicted in FIGS. 4 through 12, the present invention provides a slicing wheel assembly 50 for slicing food products 92. As shown in FIG. 4, the slicing wheel assembly 50 is made up of a hub 52, an annular-shaped rim 54 circumscribing the hub 52 so as to define an annular space 55 therebetween, and arcuate blades 56 extending between and being removably attached to the hub 52 and rim 54, such as with bolts or other fasteners. Suitable materials for the hub 52 and rim 54 include Type 303 stainless steel, and suitable materials for the blades 56 include hardened Type 416 stainless steel, though the use of other materials is foreseeable. While FIG. 4 shows the wheel assembly 50 as containing six blades 56, it should be understood that fewer and greater numbers of blades 56 could be used. The hub 52, rim 54, and blades 56 lie a cutting plane of the wheel assembly 50. The rim 54 serves to stabilize the blades 56 and maintain the blades 56 in the cutting plane, and as such the cutting plane can be defined to tight tolerances of less than 0.010 inch (about 0.25 mm). In use, the wheel assembly 50 can be mounted so that its cutting plane is substantially horizontal, vertical, or some angle therebetween. Food product can be continuously delivered to the slicing wheel assembly 50 with a suitable conveyor-type means (not shown).

Each blade 56 has an arcuate cutting edge 58 on a convex portion thereof that faces the direction of rotation 60 of the wheel assembly 50. As mounted in the wheel assembly 50, each blade 56 also has a radially innermost extent 62 and a radially outermost extent 64. As evident from FIG. 4, the chordal distance between the innermost and outermost extents 64 of each blade 56 is greater than the radial distance spanning the annular space 55 between the hub 52 and rim 54. As a result, when mounted in the wheel assembly 50, the innermost and outermost extents 62 and 64 of a given blade 56 do not lie on the same radial of the wheel assembly 50. More particularly, the outermost extent 64 of each blade 50 lies on a radial of the wheel assembly 50 that is circumferentially spaced from the radial of its corresponding innermost extent 62 in a direction opposite the assembly's direction of rotation 60. This relationship is represented in FIG. 4 with one of the blades 56 whose innermost extent 62 is depicted as lying on a first radial 66 and whose outermost extent 64 is depicted as lying on a second radial 68 that is, in reference to the direction of rotation 60, circumferentially spaced nearly ninety degrees behind the first radial 66. Finally, the cutting edge 58 of each blade 56 preferably has a constant radius of curvature that is greater than the radial distance spanning the annular space 55 between the hub 52 and rim 54. It is believed that, in combination, the offset radials 66 and 68 and the curvature of the blades 56 cause the cutting edge 58 of each blade 56 to be presented to a product to be cut such that the cutting action is a gradual slicing action instead of a chopping action, and that the result is a reduced tendency for a soft pliable product to form a protrusion or tail 22 of the type represented in FIG. 3.

Figure 7:
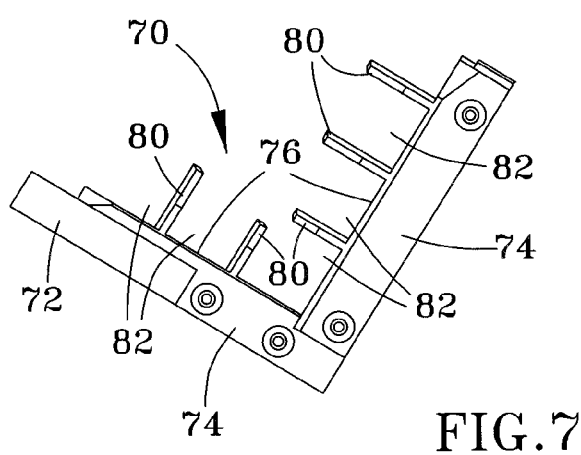
FIG. 7 represents a plan view of a gated shear edge assembly suitable for use with the slicing wheel assembly of FIG. 4.

FIG. 7 represents a gated shear edge assembly 70 suitable for use with the slicing wheel assembly 50 of FIG. 4 for the purpose of stabilizing a food product being fed through the wheel assembly 50 in a direction transverse to the cutting plane of the assembly 50 and through the annular space 55 between the hub 52 and rim 54. The gated shear edge assembly 70 is shown as being made up of a shear edge member 72 and two gate members 74 mounted thereon. The shear edge member 72 has a generally V-shaped configuration, with the interior edge of each leg of the V-shape defining a shear edge 76 against which the slicing action of each blade 56 occurs. The gate members 74 have gates 80 that, when the gate members 74 are mounted to the shear edge member 72 as shown in FIG. 7, each gate 80 extends perpendicularly to the shear edge 76 of the leg to which it is mounted. When used in combination with the wheel assembly 50 of FIG. 4, the gated shear edge assembly 70 represented in FIG. 7 is preferably installed so that one of the shear edges 76 lies in a radial of the wheel assembly 50, with one of the gate members 74 secured to the shear edge member 72 so that its gates 80 extend perpendicularly from the edge 76 to define stabilizing surfaces. The second edge 76 is perpendicular to a radial of the wheel assembly 50, and individual gates 80 extend perpendicularly from the second edge 76 to define additional stabilizing surfaces. Individual food products are preferably singly fed through the individual passages 82 generally delineated by and between adjacent gates 80. As such, the shear edge assembly 70 depicted in FIG. 7 can simultaneously accommodate six food products within the six passages 82 shown.

According to a preferred aspect of the invention, both edges 76 define a clearance with the cutting plane of the wheel assembly 50, such that a gap of not greater than about 0.010 inch (about 0.25 mm) is present between the edge 76 and the blades 56. More preferably, the shear edge clearance gap is about 0.005 inch (and 0.13 mm) to not more than 0.010 inch (about 0.25 mm). Because of this very small clearance, the contribution of the rim 54 to the rigidity of the wheel assembly 50 is believed to be an important aspect of the invention.

Figure 8:
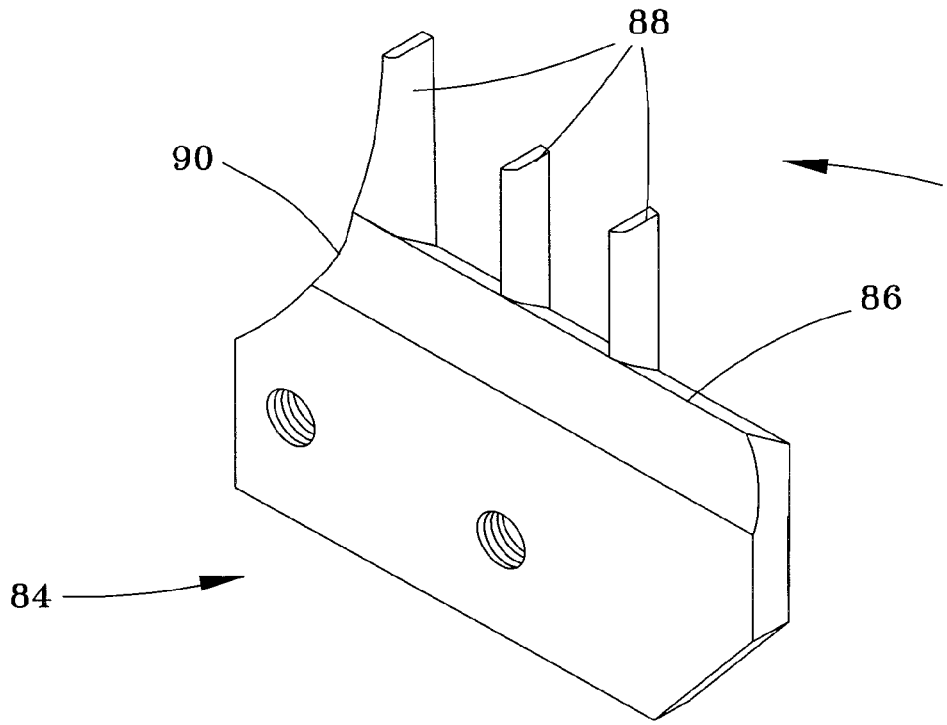
FIG. 8 represents a perspective view of an alternative gated shear edge assembly suitable for use with the slicing wheel of FIG. 4.

FIG. 8 represents an alternative configuration for a gated shear edge 84 that can be used with the wheel assembly 50 of this invention. In FIG. 8, a single shear edge 86 is provided with multiple gates 88 extending perpendicularly therefrom. When used in combination with the wheel assembly 50 of FIG. 4, the gated shear edge 84 represented in FIG. 8 is preferably installed so that its shear edge 86 lies in a radial of the slicing wheel assembly 50, with its gates 88 extending perpendicularly from the edge 86 to define stabilizing surfaces. The gated shear edge 84 is formed to have an arcuate edge 90 to provide clearance with the hub 52 of the wheel assembly 50.

Figure 9:
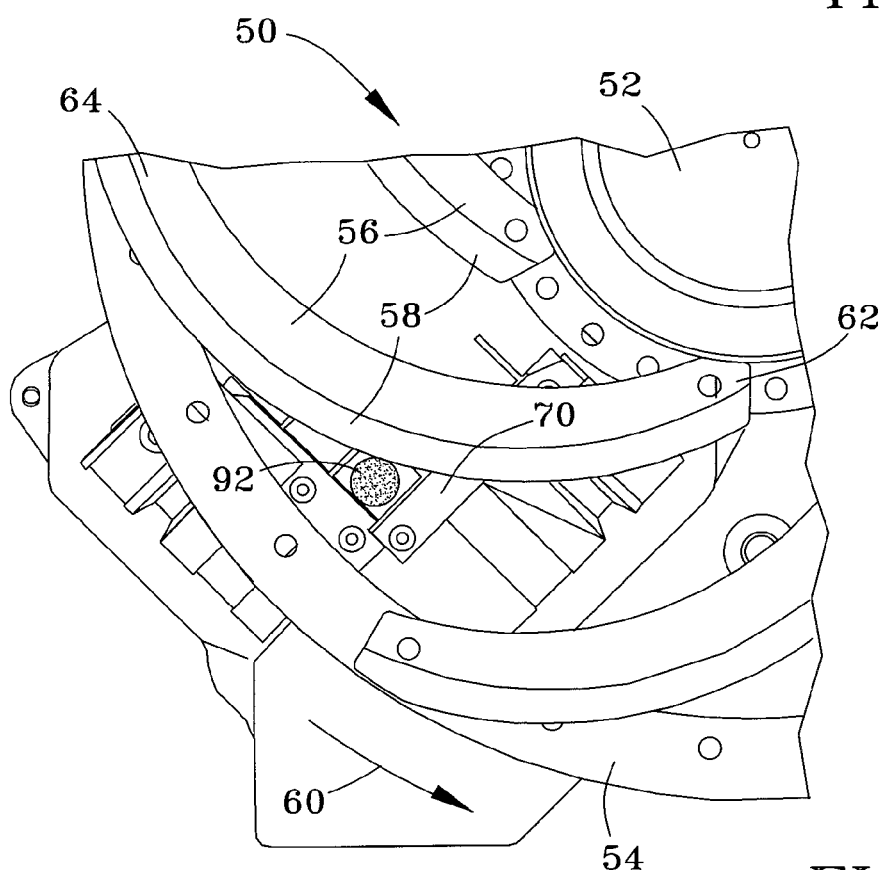
FIGS. 9 through 11 represent a slicing sequence performed by the slicing wheel assembly of FIG. 4 through a soft pliable food product.
Figure 10:
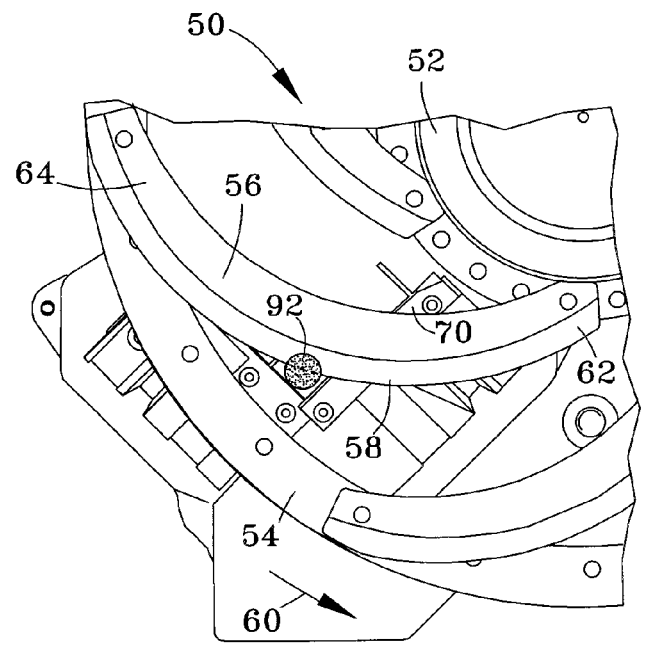
Figure 11:
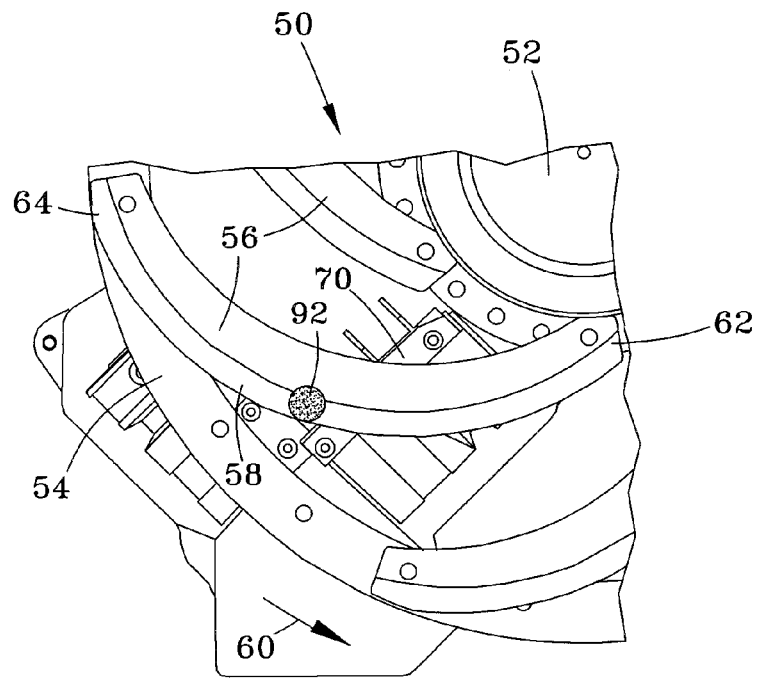
Figure 12A:
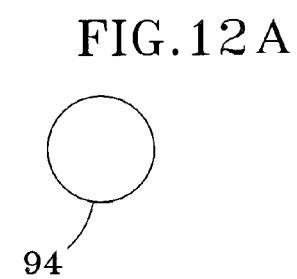
FIGS. 12A and 12B are top and side views, respectively, that represent the appearance of a soft pliable food product produced by the slicing sequence of FIGS. 9 through 11.
Figure 12B:
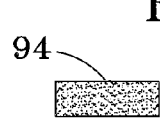

FIGS. 9, 10, and 11 represent fragmentary views of the wheel assembly 50 of FIG. 4 in combination with the gated shear edge assembly 70 of FIG. 7. As evident from FIGS. 9, 10, and 11, the blades 56 and gated shear edge assembly 70 are configured to cause a slicing action through a food product 92, for example, a rod or cylindrical-shaped dough. As evident from FIG. 9, the slicing action starts at a surface of the food product 92 that faces almost radially inward toward the hub 52, roughly at a point about forty-five degrees from either leg of the shear edge member 72. The slicing action then proceeds through the food product 92 toward the intersection of legs of the shear edge member 72, roughly at an angle of about forty-five degrees to a radial of the wheel assembly 50, until the slicing action is completed at or near a radially outward extent of the food product 92. By comparing FIGS. 9, 10 and 11 to FIGS. 1 and 2, it can be appreciated that the slicing action is different from the chopping action performed with the cutting wheel 10 of the prior art. In particular, regardless of the cross-section of the product 92, contact between the product 92 and the cutting edge 58 of the blade 56 does not remain at the same general location of the blade 56 throughout the cutting action, but instead shifts toward the outermost extent 64 of the blade 56. This slicing action has been shown to be capable of more consistently and uniformly forming a final food product 94, which as represented in FIGS. 12A and 12B (top and side views, respectively) is generally disk-shaped as a result of retaining the round cross-section of the original product 22, and lacks the tail (22 in FIGS. 3A and 3B) that often forms when prior art cutting wheels are used to reduce soft pliable food products.

While the invention has been described in terms of particular embodiments, it is apparent that other forms could be adopted by one skilled in the art. Therefore, the scope of the invention is to be limited only by the following claims.

The invention claimed is:

1. A slicing apparatus comprising:
a slicing wheel assembly comprising a hub about which the slicing wheel assembly rotates, a rim circumscribing the hub so as to define an annular space therebetween, and arcuate blades extending between and removably attached to the hub and rim, the hub, the rim, and the blades lying in a cutting plane of the slicing wheel assembly, each of the blades having an arcuate cutting edge on a convex portion thereof, each blade having a radially innermost extent and a radially outermost extent that do not lie on the same radial of the slicing wheel assembly; and
means for stabilizing a food product when fed through the slicing wheel assembly in a direction transverse to the cutting plane and between the hub and the rim, the stabilizing means comprising at least one shear edge and gates that extend from the at least one shear edge to define stabilizing surfaces and form at least one passage with the at least one shear edge so that, during slicing of the food product by one of the blades, the cutting edge of the one blade is presented to the food product to cause a slicing action that occurs against the at least one shear edge, the food product is stabilized within the at least one passages by the stabilizing surfaces and contact between the food product and the cutting edge of the one blade does not remain at the same location of the one blade throughout the slicing action, but instead shifts toward the outermost extent of the one blade.

2. The slicing apparatus according to claim 1, wherein the slicing wheel assembly has a direction of rotation, the cutting edge of each blade faces the direction of rotation, the radially innermost extent of each blade lies on a first radial of the slicing wheel assembly, and the radially outermost extent of each blade lies on a second radial of the slicing wheel assembly circumferentially spaced from the first radial in a direction opposite the direction of rotation.

3. The slicing apparatus according to claim 2, wherein the first and second radials are circumferentially spaced about ninety degrees apart.

4. The slicing apparatus according to claim 1, wherein the cutting edge of each blade preferably has a constant radius of curvature.

5. The slicing apparatus according to claim 4, wherein the radius of curvature is greater than a radial distance spanning the annular space between the hub and the rim.

6. The slicing apparatus according to claim 1, wherein the innermost and outermost extents of each blade define a chordal distance therebetween that is greater than a radial distance spanning the annular space between the hub and the rim.

7. The slicing apparatus according to claim 1, wherein the at least one shear edge is spaced not more than 0.25 mm from the cutting plane.

8. The slicing apparatus according to claim 1, wherein the stabilizing surfaces comprise first and second stabilizing surfaces defined by the gates, the first stabilizing surface lies in a radial of the slicing wheel assembly, and the second stabilizing surface is perpendicular to the first stabilizing surface.

9. The slicing apparatus according to claim 1, wherein the stabilizing surfaces comprise a first stabilizing surface and a plurality of second stabilizing surfaces defined by the gates, the first stabilizing surface lies in a radial of the slicing wheel assembly, and each of the second stabilizing surfaces is perpendicular to the first stabilizing surface.

10. The slicing apparatus according to claim 1, wherein the blades and the stabilizing means are configured to cause a slicing action through the food product starting at a radially inward extent of the food product and being completed at a radially outward extent of the food product.

11. A slicing method using the slicing apparatus according to claim 1, the method comprising:

delivering a food product to the slicing wheel assembly as the slicing wheel assembly rotates, the food product being delivered through the annular space and in a direction transverse to the cutting plane and between the hub and the rim;

stabilizing the food product with the stabilizing surfaces of the stabilizing means as the food product is fed through the slicing wheel assembly; and slicing the food product with one of the blades, during which the cutting edge of the one blade is presented to the food product to cause a slicing action that occurs against the at least one shear edge, the food product is stabilized by the stabilizing surfaces and contact between the food product and the cutting edge of the one blade does not remain at the same location of the one blade throughout the slicing action, but instead shifts toward the outermost extent of the one blade.

12. The slicing method according to claim 11, wherein the slicing wheel assembly has a direction of rotation, the cutting edge of each blade faces the direction of rotation, the radially innermost extentof each blade lies on a first radial of the slicing wheel assembly, and theradially outermost extent of each blade lies on a second radial of the slicingwheel assembly circumferentially spaced from the first radial in a directionopposite the direction of rotation.

13. The slicing method according to claim 12, wherein the first and second radials are circumferentially spaced about ninety degrees apart.

14. The slicing method according to claim 11, wherein the cutting edge of each blade preferably has a constant radius of curvature.

15. The slicing method according to claim 14, wherein the radius of curvature is greater than a radial distance spanning the annular space between the hub and the rim.

16. The slicing method according to claim 11, wherein the innermost and outermost extents of each blade 56 define a chordal distance therebetween that is greater than a radial distance spanning the annular space between the hub and the rim.

17. The slicing method according to claim 11, wherein the stabilizing surfaces comprise first and second stabilizing surfaces defined by the gates of the stabilizing means, the first stabilizing surface lies in a radial of the slicing wheel assembly, the second stabilizing surface is perpendicular to the first stabilizing surface, and the at least one shear edge is spaced not more than 0.25 mm from the cutting plane of the slicing wheel assembly.

18. The slicing method according to claim 11, wherein the slicing action through the food product initiates at a radially inward extent of the food product and is completed at a radially outward extent of the food product.

19. The slicing method according to claim 11, wherein the slicing action through the food product does not cause yielding and tearing of the food product such that a slice of the food product formed by the slicing action is free of a protrusion.

20. The slicing method according to claim 11, wherein the food product is soft and pliable.

* * * * *